(12) United States Patent
Takahashi et al.

(10) Patent No.: US 7,864,755 B2
(45) Date of Patent: Jan. 4, 2011

(54) MOBILE NODE, BASE STATION, ROUTER AND PACKET COMMUNICATION SYSTEM THAT COMPLIES WITH AN EDGE MOBILITY SCHEME

(75) Inventors: Hideaki Takahashi, Yokohama (JP); Masayuki Motegi, Yokohama (JP); Yasuhiro Kato, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 465 days.

(21) Appl. No.: 11/344,114

(22) Filed: Feb. 1, 2006

(65) Prior Publication Data
US 2007/0280149 A1    Dec. 6, 2007

(30) Foreign Application Priority Data
Feb. 1, 2005    (JP)    ............... 2005-025309

(51) Int. Cl.
*H04L 12/66* (2006.01)
(52) U.S. Cl. .................. 370/356; 370/355; 370/395.52; 370/401; 370/238; 370/397; 370/352; 370/254; 370/338; 455/428; 455/455
(58) Field of Classification Search ...... 455/422.1–455, 455/524–525, 405; 370/328, 331, 338, 351, 370/389, 352, 392, 390, 356
See application file for complete search history.

(56) References Cited

U.S. PATENT DOCUMENTS 7,330,449 B2 * 2/2008 Takahashi et al. ............ 370/331
2003/0087646 A1 5/2003 Funato et al.
2003/0123429 A1* 7/2003 Hirota et al. ................. 370/351
2004/0082312 A1 4/2004 O'Neill et al.
2004/0114558 A1 6/2004 Krishnamurthi et al.

FOREIGN PATENT DOCUMENTS

| CN | 1520219 | 8/2004 |
|---|---|---|
| EP | 1 432 208 A2 | 6/2004 |
| JP | 8-331150 | 12/1996 |

(Continued)

OTHER PUBLICATIONS

A. Campbell, et al., "Cellular IP", <draft-ietf-mobileip-cellularip-00.txt>, IETF, Jan. 2000, pp. 1-22.

(Continued)

*Primary Examiner*—Charles N Appiah
*Assistant Examiner*—Randy Peaches
(74) *Attorney, Agent, or Firm*—Oblon, Spivak, McClelland, Maier & Neustadt, L.L.P.

(57) ABSTRACT

A mobile node in a packet communication system including a node, a link and a base station that complies with an Edge Mobility scheme is disclosed. The mobile node includes: a route information reporting unit configured to report route information that is information of a route to the own mobile node; a route information registering unit configured to obtain route information to at least one of the base station and a default router, and register the route information in a route control table; a storing unit configured to store the route control table; and a packet transmission unit configured to transmit a packet based on the route information stored in the route control table.

14 Claims, 14 Drawing Sheets

FOREIGN PATENT DOCUMENTS

JP    2004-304841    10/2004

OTHER PUBLICATIONS

R. Ramjee, et al., "IP micro-mobility support using HAWAII", <draft-ietf-mobileip-hawaii-01.txt>, IETF, Jul. 1999, pp. 1-25.

S. Deering, et al., "Internet Protocol, Version 6 (IPv6) Specification", Request For Comments 2460, Dec. 1998, pp. 1-30.

D. Johnson, et al., "Mobility Support in IPv6", Request For Comments 3775, Jun. 2004, pp. 1-125.

Takatoshi Okagawa, et al., "Basic primitives and packet transmission mechanism in IP$^2$", Technical Report of IEICE, the Institute of Electronics, Information and Communication Engineers, Nov. 2002, pp. 1-6.

3GPP TS 23.003 V6.2.0, "Numbering, addressing and identification (Release 6)", Mar. 2004, pp. 1-41.

R. Hinden, et al., "IP Version 6 Addressing Architecture", Request For Comments 2373, Jul. 1998, pp. 1-20.

JinHyeock Choi, et al., "Fast Router Discovery with RA Caching; draft-jinchoi-dna-frd-00.txt", Internet draft, XP-015030539, Jul. 12, 2004, pp. 1-11.

Katsutoshi Nishida, et al., "Proposal of Packet Transport Methods for IP-host Address and IP-routing Address Separation Model in IP-based IMT Network Platform", The Institute of Electronics, Information and Communication Engineers; IEICE Technical Report vol. 102, Sep. 23, 2002, pp. 105-110.

* cited by examiner

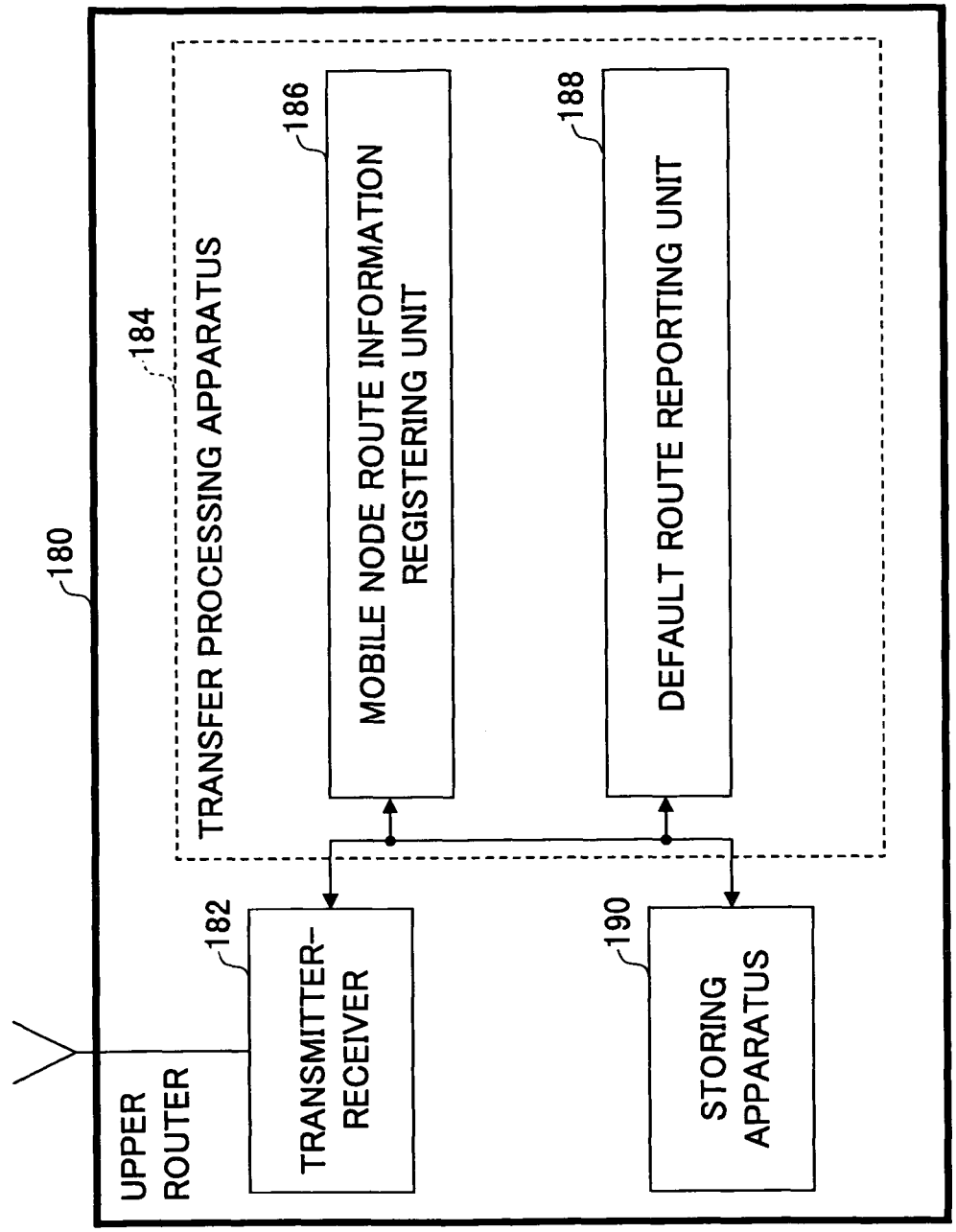

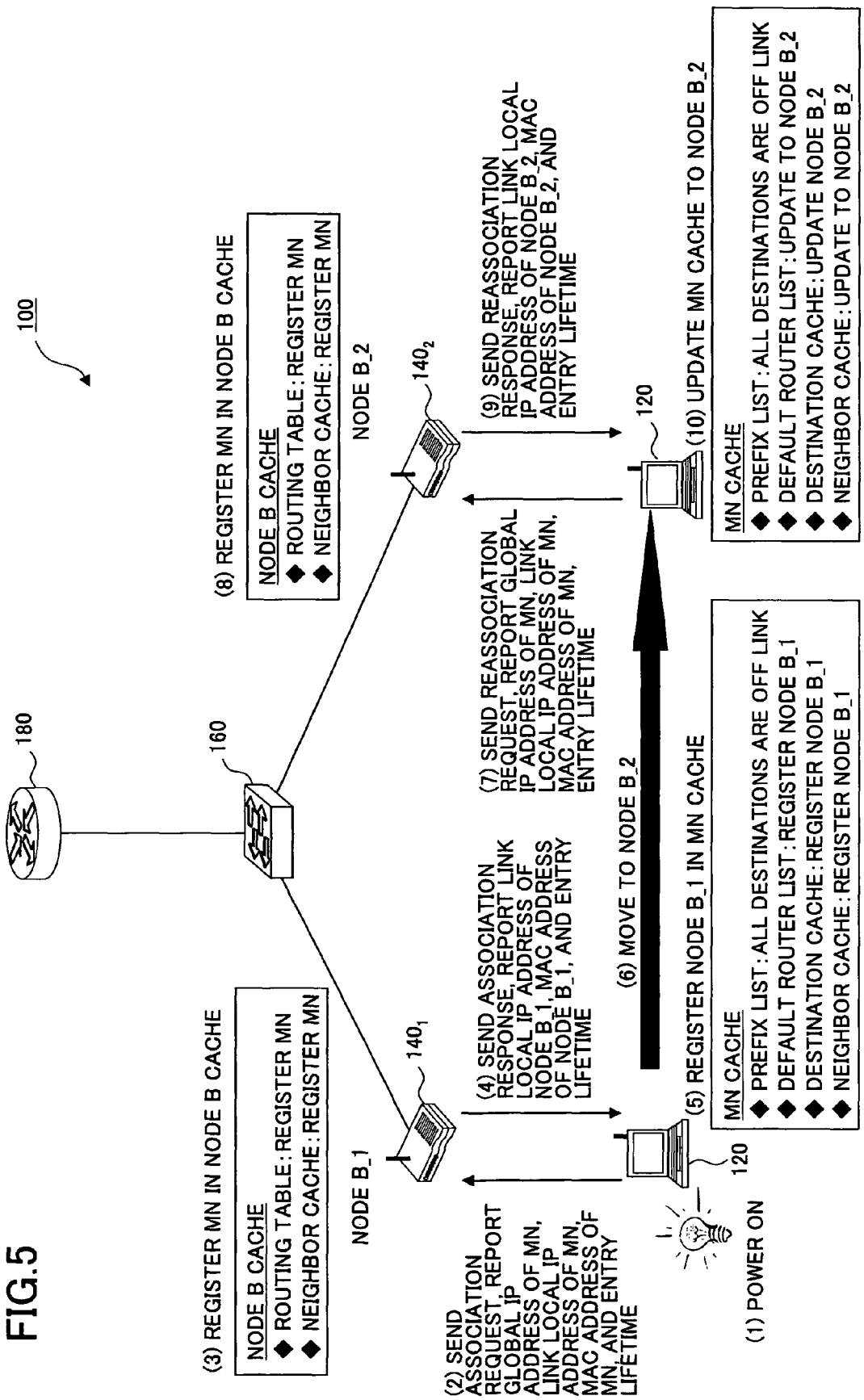

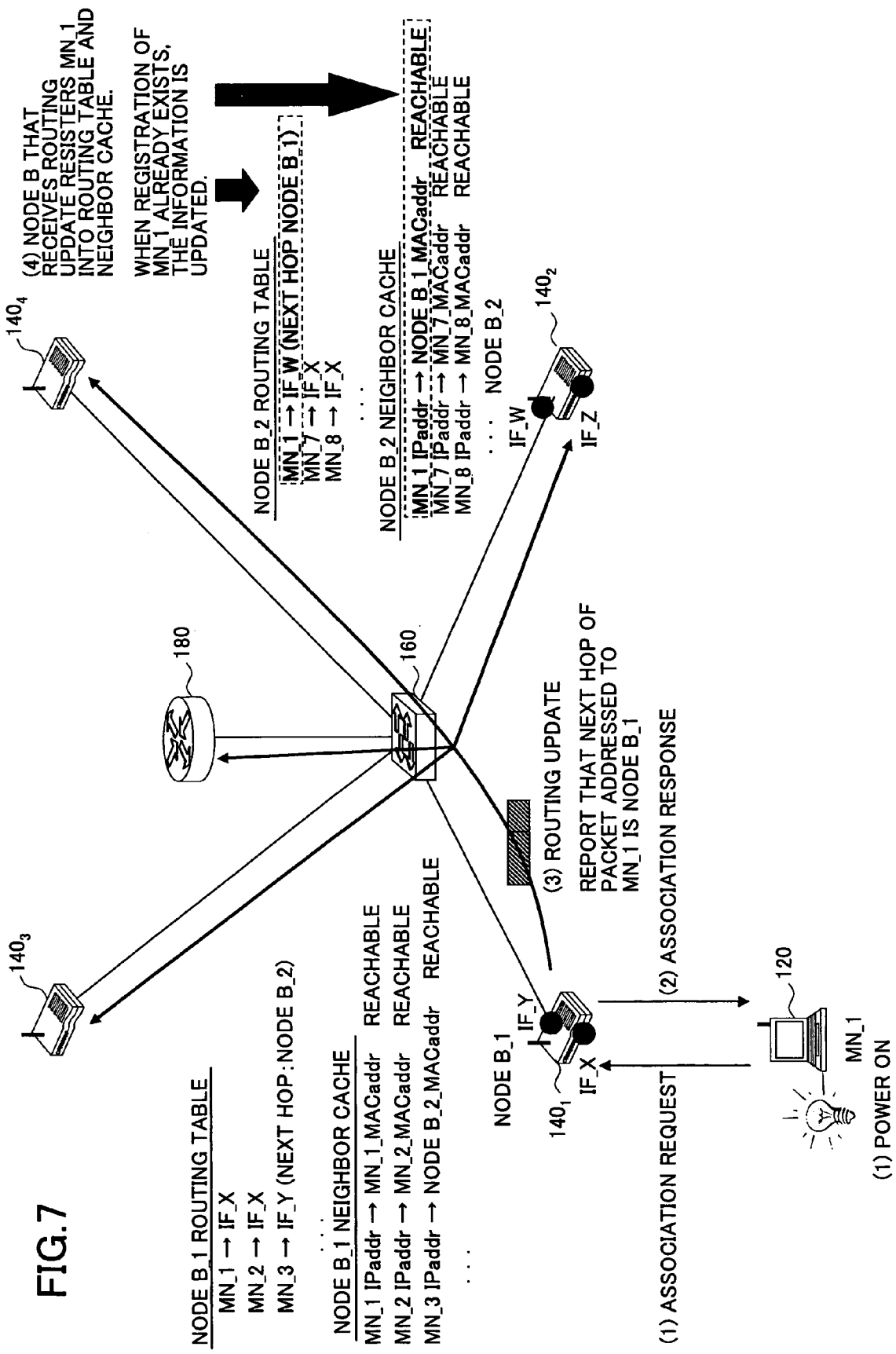

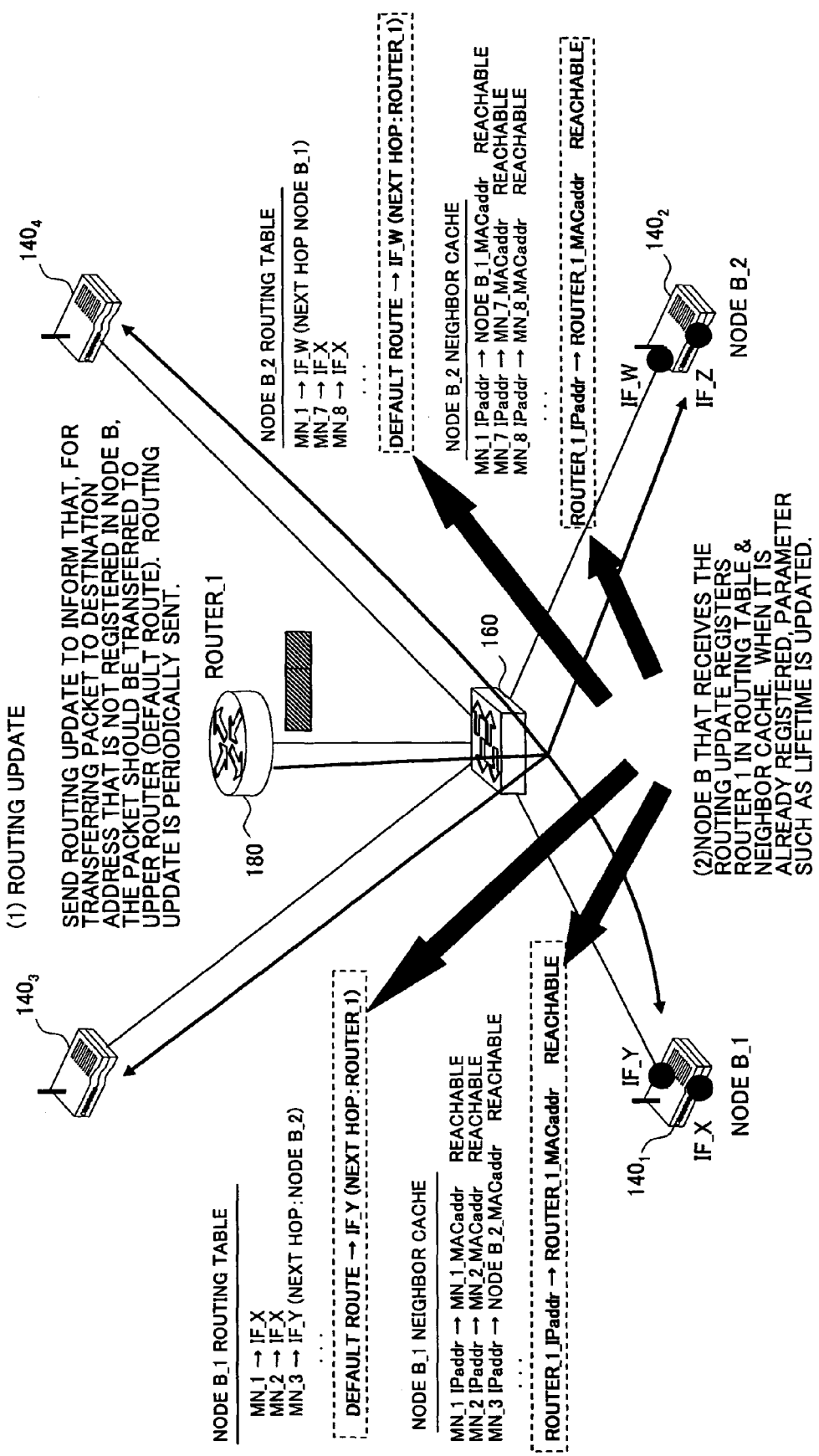

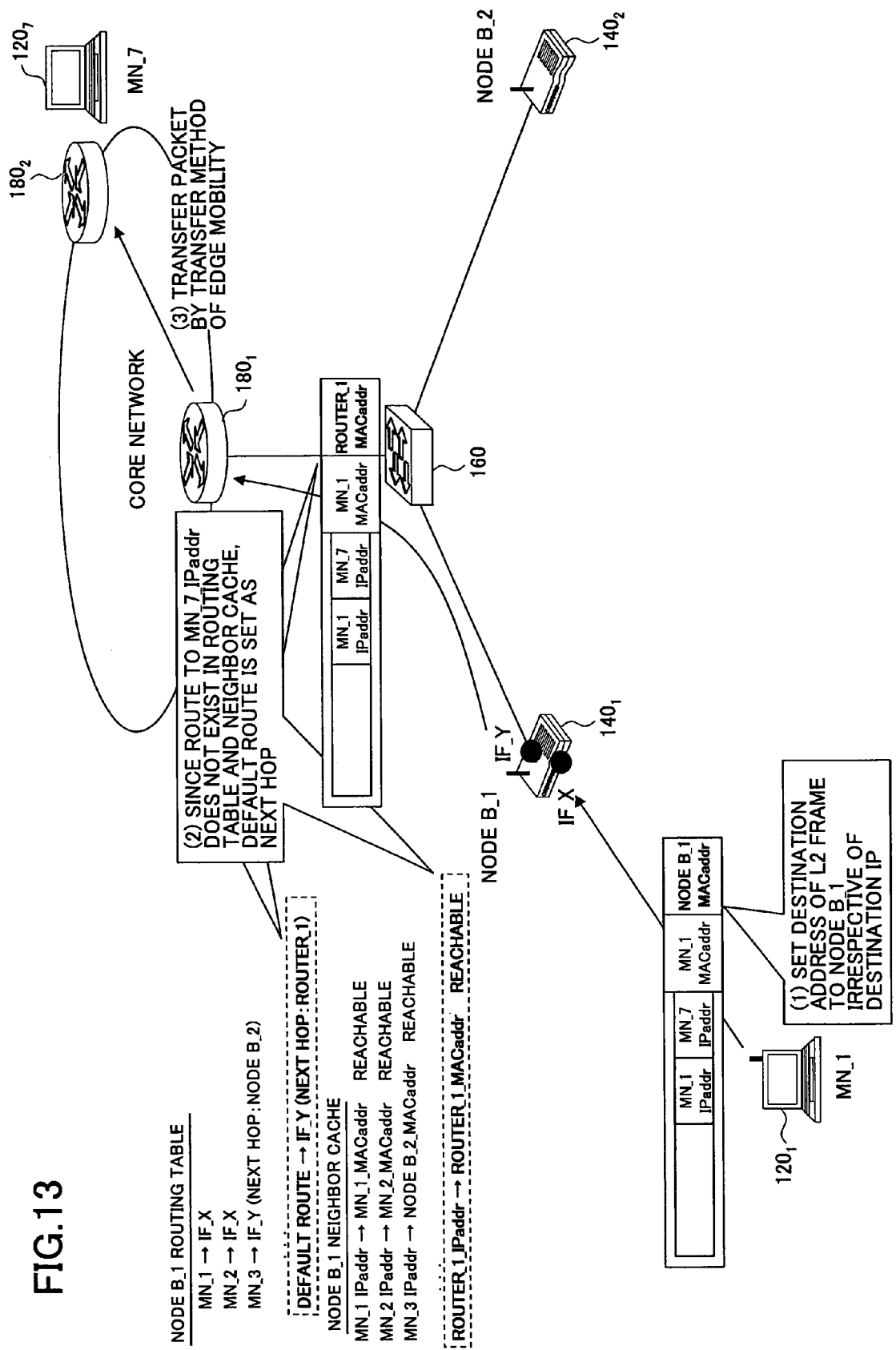

MOBILE NODE, BASE STATION, ROUTER AND PACKET COMMUNICATION SYSTEM THAT COMPLIES WITH AN EDGE MOBILITY SCHEME

BACKGROUND OF THE INVENTION

1. Field of the Invention

The present invention relates to a mobile node, a base station, and a router in a packet communication system conforming to Edge Mobility, and relates to the packet communication system.

2. Description of the Related Art

In the Internet using the Internet Protocol version 6 (IPv6) (refer to non-patent document 1, for example), Mobile IPv6 (refer to non-patent document 2, for example) exists as a technology for enabling a node to keep communications with another node that is a communication partner even though the node moves so that links to which the node connects successively change.

The Mobile IPv6 defines a mobile node (MN) that moves in the Internet and a home agent (HA) that exists on a predetermined link in the Internet and that transfers a packet addressed to the MN to the MN.

The MN uses a home address (HoA) determined from the link where the HA exists and a care of address (CoA) determined from a link where the MN currently exists. The MN updates CoA every time when the MN moves. Then, the MN reports binding information indicating correspondence between HoA and CoA to the HA using a Binding Update (BU) message. The HA encapsulates a packet addressed to the HoA of the MN sent by a communication partner into a packet addressed to CoA indicated by the binding information. In the Mobile IP, communications between the MN and the partner node are ensured according to the above-mentioned operations.

Edge Mobility (refer to non-patent document 3, for example) is another technology for providing mobility on the IP layer like the Mobile IPv6. Compared with Mobile IPv6, the Edge Mobility has merits in that control signals in wireless sections and overheads can be decreased and that topology information of nodes can be hidden. On the other hand, according to the Mobile IPv6, topology information and geographical position of the MN can be estimated by referring to a Network Prefix in CoA.

Edge Mobility defines an access router that is a default router of the MN, and a routing manager (RM) for managing mapping of addresses corresponding to the MN. In addition, the Edge Mobility defines two kinds of addresses that are IP host address (IPha) and IP routing address (IPra) as addresses for transferring a packet to MN.

The IPha is an address which the MN recognizes as its own address. When communicating with an arbitrary MN, an IPha of the communication partner is designated as a destination address and an IPha of the MN is designated as a source address. Although the IPha can be used for transferring an IP packet among sections of MN—mobile station (Node B)—AR, the IPha cannot be used for transferring a packet in the Core Network (CN) that exists ahead of the AR. The IPra is an address of the MN that can be used for transferring the IP packet in the Core Network (CN).

The AR obtains the IPha and IPra of a MN under the AR, and obtains the IPha and IPra of a communication partner MN from the RM. The AR converts IPha in an IP header of a packet transferred from the Radio Access Network (RAN) to the CN into IPra, and converts IPra in an IP header of a packet transferred from the CN to the RAN into IPha.

A concrete example of packet transfer is described with reference to FIG. 1.

For example, MN_A sends a packet for MN_B (1). In this case, the destination is IP host address of the MN_B. The IP host address is an IP address held by MN, and that is not applicable for Routing in the Core Network as mentioned above.

The transmitted packet is transferred to the AR. The AR obtains, from the RM, IPha and IPra of the MN under the AR and IPha and IPra of the transmission destination. The RM holds address correspondences for all MNs residing in the network. In addition, the AR converts each of source and destination addresses in the IP header of the transmitted packet addressed to the MN_B from IP host address to IP routing address (2). As mentioned above, the IP routing address is an address that corresponds to the IP host address and that can be used for routing in the Core Network.

The address-converted packet addressed to the MN_B is transferred to an upper AR of the MN_B. The upper AR of the MN_B converts each of source and destination addresses of the IP header of the packet addressed to the MN_B from IP routing address to IP host address, and transfers the packet (3). The transferred packet addresses to the MN_B is received by the MN_B (4).

In Edge Mobility, according to the above-mentioned method, since a MN can ascertain only IP address of the destination MN, topology information is hidden. In addition, by performing address conversion, header overhead due to header encapsulation performed in Mobile IPv6 does not arise. Following are documents relating to the present application:

[Non-patent document 1] S. Deering and R. Hinden, "Internet Protocol, Version 6 (IPv6) Specification", Request For Comments 2460, December, 1998;

[Non-patent document 2] D. Johnson, et al., "Mobility Support in IPv6," Request For Comments 3775, June, 2004;

[Non-patent document 3] Okagawa et. al. "IP packet routing mechanism in IP2", IEICE, IN-MoMuC study group, November 2002;

[Non-patent document 4] 3GPP TS 23.003V6.2.0, "Numbering, addressing and identification (Release 6)", March, 2004;

[Non-patent document 5] R. Hinden, et al., "IP Version6 Addressing Architecture", Request For Comments 2373, July, 1998.

However, the above-mentioned conventional technology includes the following problems.

In Edge Mobility, since the topology information is hidden by address conversion, the IP address that can be used for packet transfer in RAN is IPha. Network Prefix of the IPha is the same for every mobile node MN. Therefore, the RAN as a whole becomes a large subnet. Therefore, there is a problem in that generation of a routing table and packet transfer using Network Prefix, which are performed in IP, cannot be performed.

To solve this problem, there is a method in which the Node B performs frame switching on layer 2 so as to perform routing in the RAN in layer 2. However, in this case, it is necessary to use Neighbor Discovery Protocol (NDP) as a layer 2 address resolution method when the mobile node MN transmits a packet, and when the AR transfers a packet to the mobile node MN. There is a problem in that NDP affects traffic in wireless links in which bandwidth is limited.

An object of the present invention is to provide a mobile node, a base station, a router and a packet communication system that can perform optimum routing and forwarding by IP in RAM formed by nodes and links conforming to Edge Mobility.

SUMMARY OF THE INVENTION

The object is achieved by a mobile node in a packet commination system including a node, a link and a base station that complies with an Edge Mobility scheme, the mobile node including:

a route information reporting unit configured to report route information that is information of a route to the own mobile node;

a route information registering unit configured to obtain route information to at least one of the base station and a default router, and register the route information in a route control table;

a storing unit configured to store the route control table; and a packet transmission unit configured to transmit a packet based on the route information stored in the route control table.

According to the present invention, when making a belonging request to a base station to be connected, the mobile node reports route information of the mobile node to the base station, then, in response to that, the mobile node can obtain necessary information for transferring a packet to the base station.

The object is also achieved by a base station that provides wireless access in a packet communication system including a node and a link that are complies with an Edge Mobility scheme, the base station including:

a belonging mobile node registering unit configured to register route information of a mobile node that establishes belonging relationship with the base station into a route control table;

a belonging mobile node reporting unit configured to report the route information of the mobile node to at least one of a neighboring base station and an upper router;

a route information registering unit configured to obtain at least one of route information to a mobile node belonging to the neighboring base station and route information to the upper router;

a storing unit configured to store the route control table; and a packet transfer unit configured to transfer a packet based on the route control table.

According to the present invention, when receiving the belonging request from the mobile node, the base station can register the route information of the mobile node so as to report the registered route information to a near mobile station. Thus, communication between mobile nodes under different base stations can be performed on an optimum route.

The object is also achieved by a router existing in an upper side of plural base stations each providing wireless access in a packet communication system including a node and a link complying with an Edge Mobility scheme, the router including:

a mobile node route information registering unit configured to obtain route information to a mobile node and register the route information into a route control table; and a default route reporting unit configured to report route information of a mobile node belonging to a different router.

According to the present invention, a packet transfer route can be established for performing communication between mobile nodes under different upper routers.

The object is also achieved by a packet communication system including a mobile node, a router and a base station that conforms to an Edge Mobility scheme, the mobile node comprising:

a route information reporting unit configured to report route information that is information of a route to the own mobile node;

a route information registering unit configured to obtain route information to at least one of the base station and a default router, and registers the route information in a route control table;

a storing unit configured to store the route control table; and a packet transmission unit configured to transmit a packet based on the route information stored in the route control table;

the base station comprising:

a belonging mobile node registering unit configured to register route information of the mobile node that establishes belonging relationship with the base station into a route control table;

a belonging mobile node reporting unit configured to report the route information of the mobile node to at least one of a neighboring base station and an upper router;

a route information registering unit configured to obtain at least one of route information to a mobile node belonging to the neighboring base station and route information to the upper router;

a storing unit configured to store the route control table; and a packet transfer unit configured to transfer a packet based on the route control table, the router comprising:

a mobile node route information registering unit configured to obtain route information to a mobile node and register the route information into a route control table; and a default route reporting unit configured to report route information of a mobile node belonging to a different router.

According to the present invention, optimum IP routing and forwarding in Radio Access Network can be performed.

BRIEF DESCRIPTION OF THE DRAWINGS

Other objects, features and advantages of the present invention will become more apparent from the following detailed description when read in conjunction with the accompanying drawings, in which:

FIG. 4 is a block diagram showing an upper router of an embodiment of the present invention;

FIG. 5 is a figure for explaining route control table generation processing in the mobile node of an embodiment of the present invention;

FIG. 7 is a figure for explaining route control table generation processing in the base station of an embodiment of the present invention;

FIG. 9 is a figure for explaining route control table generation processing in the upper router of an embodiment of the present invention;

FIG. 13 is a flowchart showing communication between mobile nodes of an embodiment of the present invention.

DETAILED DESCRIPTION OF THE PREFERRED EMBODIMENTS

In the following, embodiments of the present invention are described with reference to figures. In the figures for describing embodiments, the same reference signs are used for components having the same functions.

The packet communication system of this embodiment follows the design concept of the Edge Mobility scheme. That is, the packet communication system protects location information of terminals and efficiently uses wireless resources so as to perform optimum routing and forwarding by IP in the Radio Access Network (RAN).

The packet communication system includes a mobile node (MN), a base station (Node B), a layer 2 switch and a router (to be referred to as an upper router hereinafter) positioned on the upper side of the base station. When the MN launches or performs hand-off, the route for the MN is updated in the RAN including the MN, the Node B and the upper router, so that a packet is transmitted.

First, a mobile node (MN) 120 of this embodiment is described.

Figure 1:
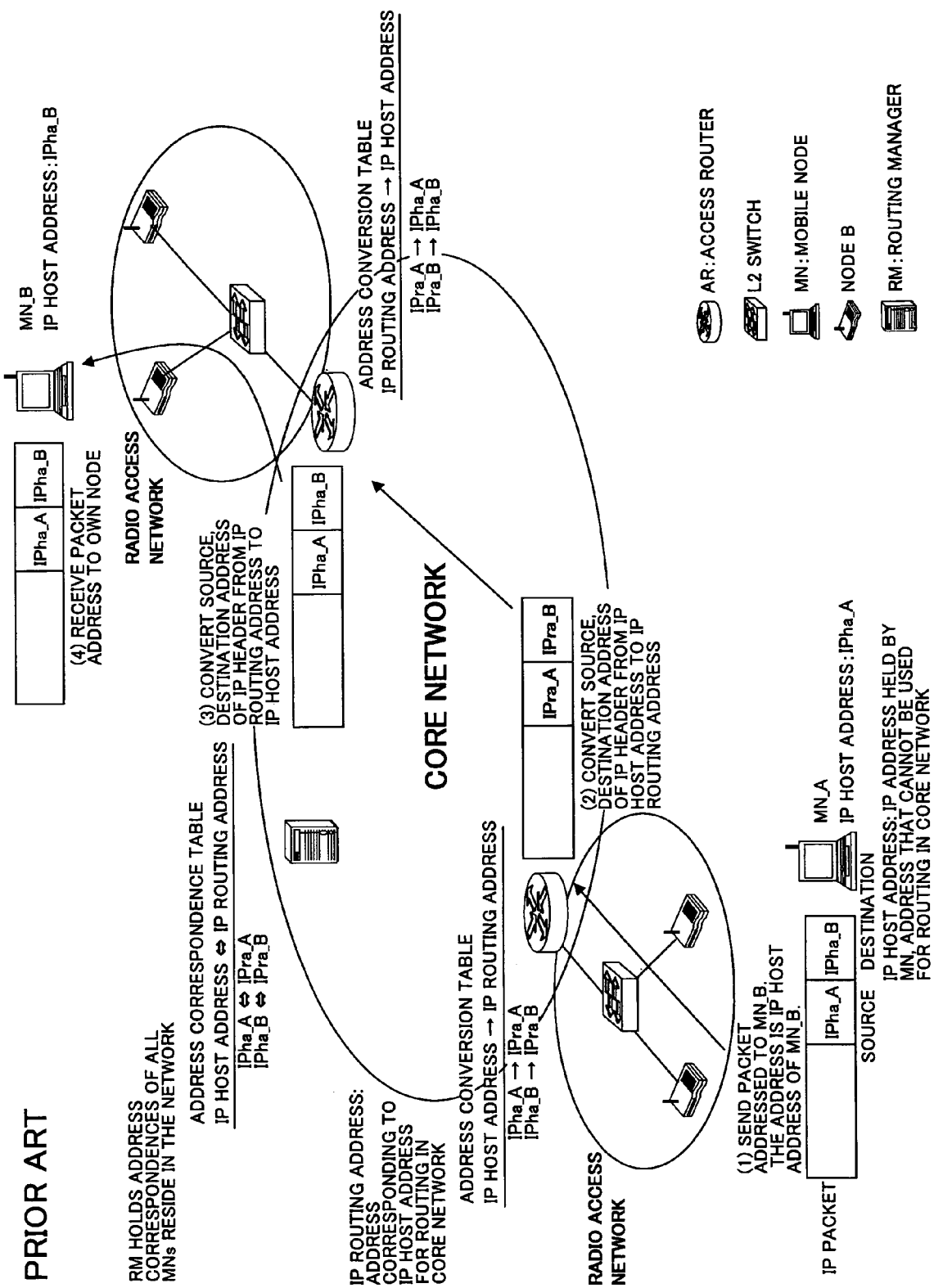
FIG. 1 is a figure for explaining Edge Mobility packet transfer.
Figure 2:
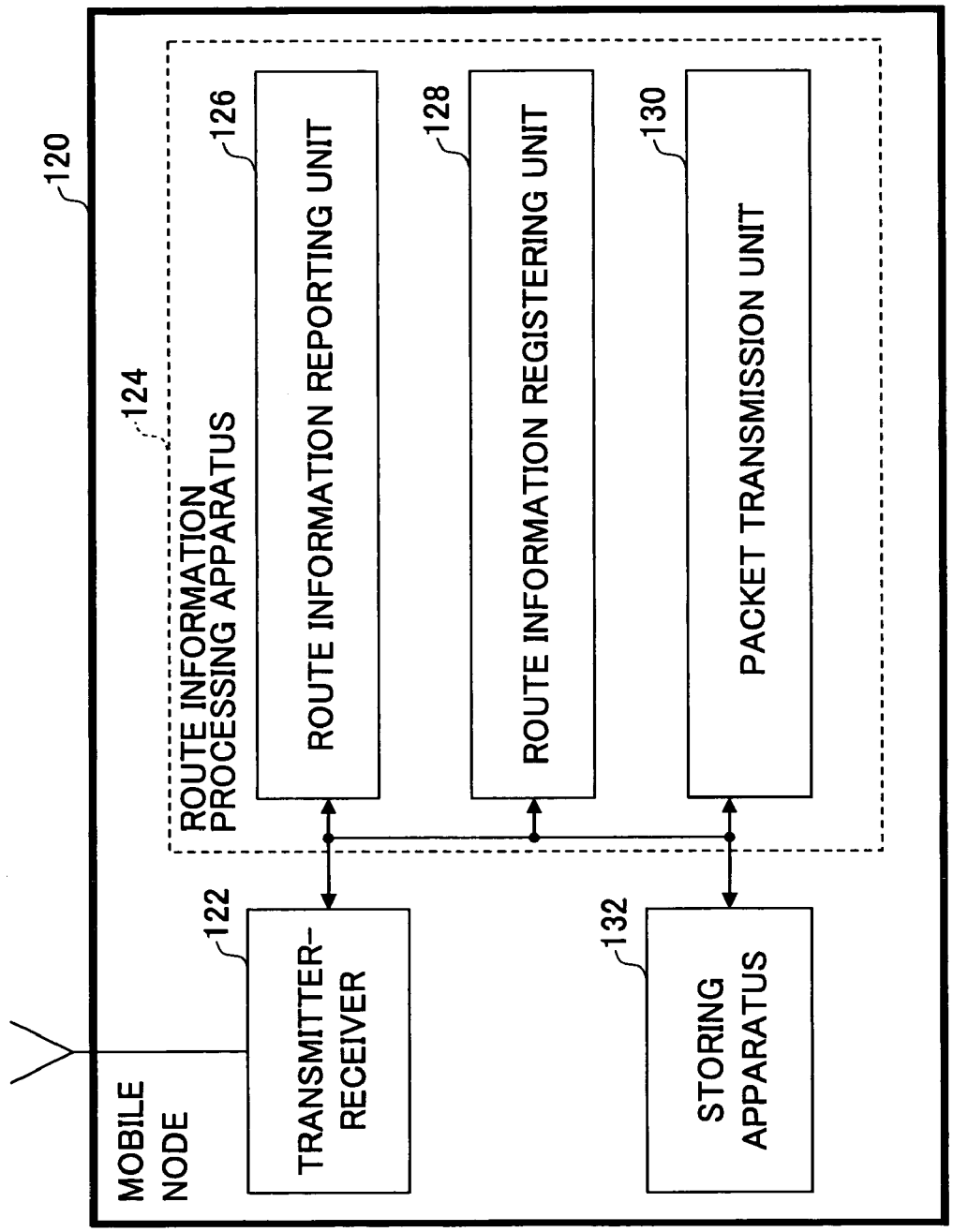
FIG. 2 is a block diagram showing a mobile node of an embodiment of the present invention.

As shown in FIG. 2, the mobile node (MN) 120 includes a transmitter-receiver 122 including an antenna, a route information processing apparatus 124 connected to the transmitter-receiver 122, and a storing apparatus 132 connected to the transmitter-receiver 122 and the route information processing apparatus 124.

The route information processing apparatus 124 includes a route information reporting unit 126, a route information registering unit 128, and a packet transmission unit 130, all connected to the transmitter-receiver 122 and the storing apparatus 132.

The transmitter-receiver 122 transmits and receives a packet. The storing apparatus 132 stores a route control table, that is, MN Cache. The route information reporting unit 126 reports route information that is information of the route to the own mobile node 120 to the base station. The route information registering unit 128 obtains route information to at least one of the base station and a default router from the base station, and registers the route information into the route control table in the storing apparatus 132. The packet transmission unit 130 transmits a packet based on the registered route information.

Next, a base station (Node B) 140 of this embodiment is described.

Figure 3:
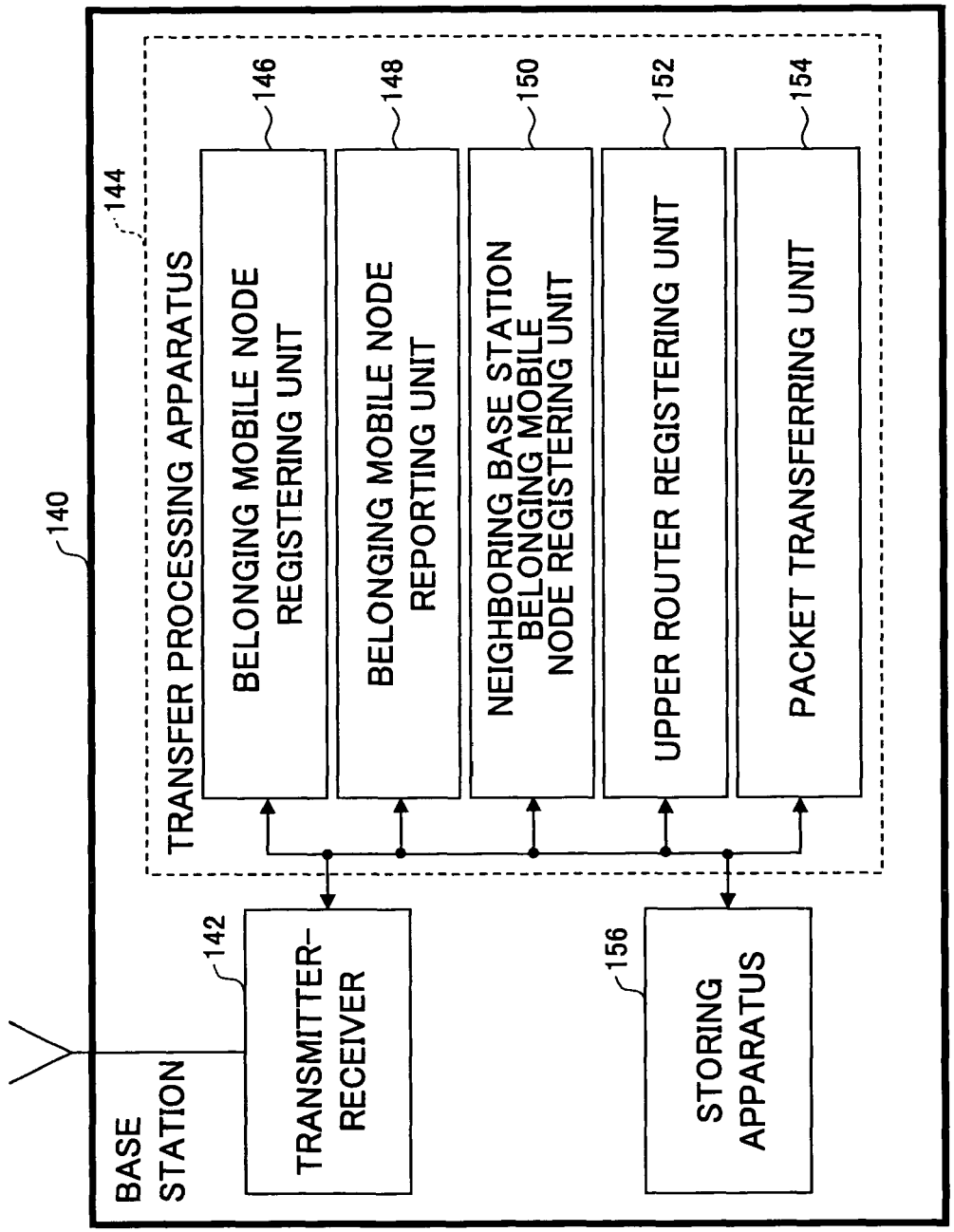
FIG. 3 is a block diagram showing a base station of an embodiment of the present invention.

As shown in FIG. 3, the base station 140 includes a transmitter-receiver 142 having an antenna, a transfer processing apparatus 144 connected to the transmitter-receiver 142, and a storing apparatus 156 connected to the transmitter-receiver 142 and the transfer processing apparatus 144.

The transfer processing apparatus 144 includes a belonging mobile node registering unit 146 a belonging mobile node reporting unit 148, a neighboring base station belonging mobile node registering unit 150, an upper router registering unit 152, and a packet transferring unit 154, all connected to the transmitter-receiver 142 and the storing apparatus 156.

The transmitter-receiver 142 transmits and receives a packet. The storing apparatus 156 stores a route control table, that is, a Routing Table and a Neighbor Cache. The belonging mobile node registering unit 146 registers route information of a mobile node for which belonging relationship with the own base station is established into the route control table stored in the storing apparatus 156. The belonging mobile node reporting unit 148 reports the route information of the mobile node having belonging relationship with the own base station to at least one of a neighboring base station and the upper router. The neighboring base station belonging mobile node registering unit 150 obtains route information of a mobile node belonging to a neighboring base station from a belonging mobile node reporting unit of another base station, and registers the route information in the route control table. The upper router registering unit 152 obtains route information to an upper router from the upper router, and registers the route information to the route control table. The packet transferring unit 154 transfers a packet based on the generated route control table. The neighboring base station belonging mobile node registering unit 150 and the upper router registering unit 152 may form a route information registering unit. In this case, the route information registering unit obtains at least one of route information of the mobile node belonging to the neighboring base station and route information to the upper router, and registers the route information in the route control table.

Next, the upper router of this embodiment is described.

As shown in FIG. 4, the upper router 180 includes a transmitter-receiver 182 having an antenna, a transfer processing apparatus 184 connected to the transmitter-receiver 182, and a storing apparatus 190 connected to the transmitter-receiver 182 and the transfer processing apparatus 184.

The transfer processing apparatus 184 includes a mobile node route information registering unit 186 and a default route reporting unit 188 both connected to the transmitter-receiver 182 and the storing apparatus 190.

The transmitter-receiver 182 transmits and receives a packet. The storing apparatus 190 stores a route control table, that is, a Routing Table and a Neighbor Cache. The mobile node route information registering unit 186 obtains route information to a mobile node, and registers the route information into the route control table in the storing apparatus 190. The default route reporting unit 188 reports route information to a mobile node belonging to a router different from the own router to the base station.

Next, processing for generating the route control tables in the mobile node 120, the base station 140 and the upper router 180 is described.

Figure 6A:
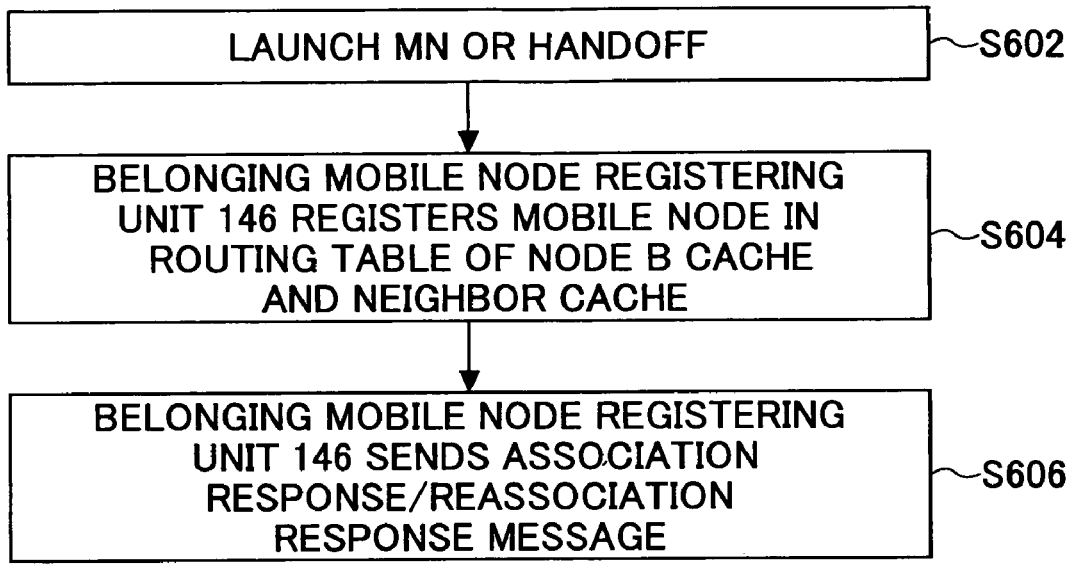
FIG. 6A is a flowchart showing the route control table generation processing in the mobile node of an embodiment of the present invention.
Figure 6B:
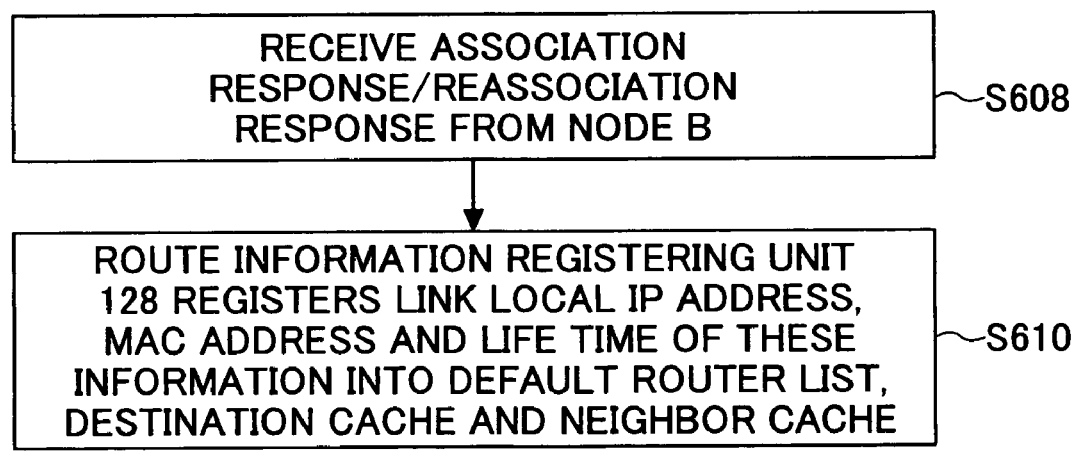
FIG. 6B is a flowchart showing the route control table generation processing in the mobile node of an embodiment of the present invention.

First, route control table generation processing in the mobile node 120 is described with reference to FIGS. 5, 6A and 6B.

The mobile node 120 exchanges route information with the base station 140 for at least one of when the mobile node 120 is launched and when hand-off between base stations is performed.

More specifically, when the mobile node 120 is launched, that is, when power is turned on (1), the mobile node 120 sends an Association Request message of RRC (Radio Resource control), for example, to a belonging base station 140₁ (Node B_1) to make a belonging request (2). In this case, the base station 140 to belong to is selected using a result of cell search by receiving notification information of neighboring base stations, for example.

In addition, as a result of the cell search, when the mobile node 120 finds a base station having higher quality than the currently belonging base station 140₁ (Node B_1), the mobile node 120 moves to the base station having higher quality. For example, when the quality of the base station 140₂ is higher than that of the base station 140₁, the mobile node 120 moves to the base station 140₂ (Node B_2) (6), and sends a Reassociation Request message of RRC, for example, to the base station 140₂ (Node B_2) to make a re-belonging request (7).

More specifically, the route information reporting unit 126 defines fields for writing, into an Association Request/Reassociation Request message, the global IP address of MN, the link local IP address of MN, the MAC address of MN and Entry Lifetime of these information. In addition, the route information reporting unit 126 sends these route information on MN to at least one of the base station 140₁ and the base station 140₂. As an address of data link layer reported by the route information reporting unit 126, UE-ID (refer to non-patent document 4, for example) can be used instead of the MAC address.

The base station 140 registers the mobile node 120 that makes the belonging request into the Routing Table and the Neighbor Cache held in the Node B Cache of the base station 140 (3), (8).

After performing the belonging process, the base station 140₁ (Node B_1) or the base station 140₂ (Node B_2) transmits an Association Response/Reassociation Response message of RRC (4), (9).

The mobile node 120 receives the Association Response/Reassociation Response message transmitted from the base station 140₁ (Node B_1) or the base station 140₂ (Node B_2) and completes the process for belonging to the Node B (5), (10).

More specifically, the route information registering unit 128 registers the link local IP address (network layer address) of Node B, the MAC address (data link layer address) of Node B, and the Entry Lifetime of these information that are written in the Association Response/Reassociation Response message into the Default Router List, the Destination Cache, and the Neighbor Cache held in the MN Cache of the mobile node 120. In this case, for example, the Prefix List is set such that all destinations are Off Link. Accordingly, the mobile node 120 exchanges route information with the base station 140 using connection establishment messages of layer 2 for at least one of when the mobile node 120 is launched and when the mobile node 120 performs hand-off.

Next, route control table generation processing in the mobile node 120 is described with reference to FIGS. 6A and 6B.

First, processing in the base station 140 is described with reference to FIG. 6A. This processing relates to the route control table generation processing in the mobile node 120.

First, the mobile station 120 performs at least one of launching processing and hand-off processing in step S602. The Association Request/Reassociation Request message is sent from the mobile station 120 to the base station 140.

Next, the belonging mobile node registering unit 146 of the base station 140 registers the mobile node 120 into the Routing Table and the Neighbor Cache held by the Node B Cache in step S604, and sends the Association Response/Reassociation Response message in step S606.

Next, processing in the mobile node 120 is described with reference to FIG. 6B.

The mobile node 120 receives the Association Response/Reassociation Response message from the base station 140 in step S608.

Next, the route information registering unit 128 registers link local IP address, MAC address and lifetime of these information reported by the Association Response/Reassociation Response into the Default Router List, the Destination Cache, and the Neighbor Cache in step S610.

Next, route control table generation processing in the base station (Node B) 140 is described.

The base station (Node B) 140 registers the route information of the mobile node belonging to the own base station, and exchanges route information with at least one of a neighboring Node B or an upper router.

More specifically, as shown in FIG. 7, the belonging mobile node registering unit 148 registers, into Routing Table and Neighbor Cache, global IP address of the mobile node 120, link local IP address of the mobile node, MAC address of the mobile node and lifetime of these information written in predetermined fields in the Association Request/Reassociation Request received from the mobile node 120.

More specifically, the belonging mobile node registering unit 146 sets a transfer destination IF (interface) for the mobile node 120 to be an IF that receives the message in the Routing Table. For example, when the Association Request/Reassociation Request message is received from the mobile node 120 (MN_1), a transfer destination IF for the mobile node 120 (MN_1) is set to IF_X. In FIG. 7, IF_X and IF_Y are registered as transfer destination IFs of MN_2 and MN_3 respectively. In this case, IF_Y indicates that the Next hop is to the base station 140₂ (Node B_2).

In addition, the belonging mobile node registering unit 146 registers the MAC address of the mobile node 120 into the Neighbor Cache. For example, when the Association Request/Reassociation Request message is sent from the mobile node 120 (MN_1), the MAC address (MN_1_MACaddr) of the mobile node 120 (MN_1) is registered for the IP address (MN_1 IPaddr) of the mobile node 120 (MN_1), and REACHABLE is set. In FIG. 7, in the Neighbor Cache, MAC address (MN_2 MACaddr) of MN_2 and MAC address (Node B_3 MACaddr) of Node B_3 are registered as the IP address (MN_2 IPaddr) of MN_2 and the IP address (MN_3 IPaddr) of MN_3 respectively, and REACHABLE is set.

Next, the belonging mobile node reporting unit 148 reports the routing information to the global IP address of the mobile node (MN) registered by the belonging mobile node registering unit 146 to the neighboring base stations 140₂, 140₃ and 140₄ and to the upper router 180 using a Routing Update message (3). For example, the belonging mobile node reporting unit 148 reports that a next hop of a packet addressed to the mobile node 120 (MN_1) is the base station 140₁ (Node B_1). The Routing Update message defines fields for writing the global IP address of the mobile node (MN) that reports the route information and the Lifetime of the route information.

Since the belonging mobile node reporting unit 148 sends the Routing Update message to every base station residing under the same upper router, the belonging mobile node reporting unit 148 sends the Routing Update message using an all node multicast address (refer to non-patent document 5, for example) as the destination address. In consideration of influence on traffic load, the belonging mobile node reporting unit 148 may send the Routing Update message only to the upper router.

When the neighboring base station belonging mobile node registering unit 150 of other base station 140 receives the Routing Update-message, the neighboring base station belonging mobile node registering unit 150 of the other base station 140 sets the transfer destination of the next hop of the packet addressed to the global IP address of the mobile node (MN) to be the source base station of the Routing Update message, and sets the transfer destination interface to be the interface at which the Routing Update message is received, and registers these data in the Routing Table. In addition, the neighboring base station belonging mobile node registering unit 150 registers MAC address of the source base station 140$_1$ (Node B_1) into the Neighbor Cache as a data link layer address used for transferring the packet to the IP address of the base station 140$_1$ (Node B_1) set as the next hop (4).

For example, when the base station 140$_2$ receives the Routing Update message from the base station 140$_1$ (Node B_1), the base station 140$_2$ registers MN_1 in the Routing Table and the Neighbor Cache. In this case, if the MN_1 is already registered, information is updated. As a result, in the Routing Table of the base station 140$_2$, the base station 140$_1$ (Node B_1) is set as the transfer destination of the next hop of the packet addressed to the mobile node 120 (MN_1), and IF_W is set as the interface of transfer destination. The IF_W is an IF that receives the Routing Update message in the base station 140$_2$, and IF_W indicates that the next hop is Node B_1. In addition, in FIG. 7, in the Routing Table of the base station 140$_2$, IF_X is registered as a transfer destination of the next hop of the packet addressed to the MN_7, and IF_X is registered as a transfer destination of the next hop of the packet addressed to the MN_8.

In the Neighbor Cache of the base station 140$_2$, the MAC address (Node B_1_MACaddr) of the base station 140$_1$ is registered for the IP address (MN_1 IPaddr) of the mobile node (MN_1), and REACHABLE is set. In addition, as shown in FIG. 7, in the Neighbor Cache of the base station 140$_2$, the MAC address (MN_7_MACaddr) of the MN_7 is registered for the IP address (MN_7 IPaddr) of the MN_7, and the MAC address (MN_8_MACaddr) of the MN_8 is registered for the IP address (MN_8 IPaddr) of the MN_8, so as to be REACHABLE.

Figure 8A:
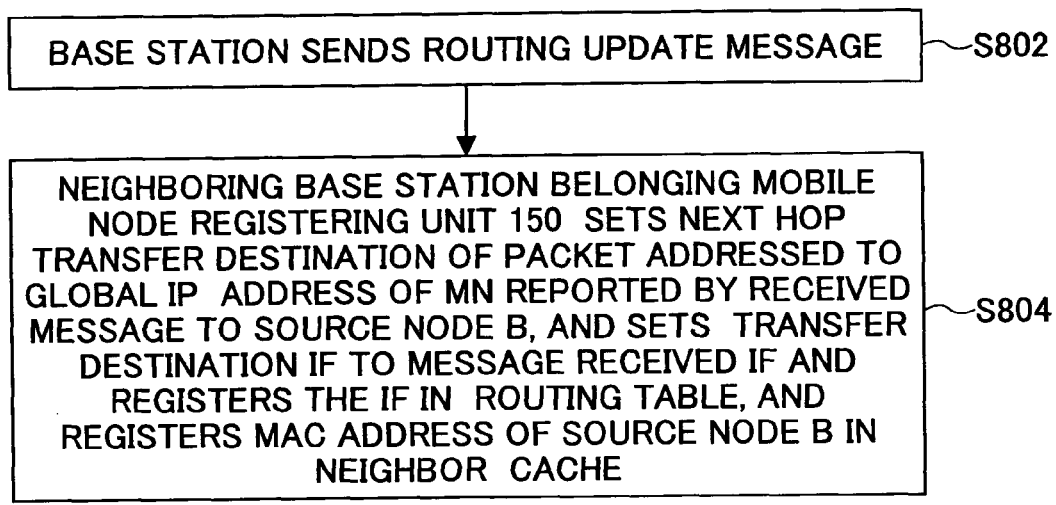
FIG. 8A is a flowchart showing the route control table generation processing in the base station of an embodiment of the present invention.

Next, route control table generation processing in the base station 140 is described with reference to FIG. 8A.

The base station 140 sends the Routing Update message in step S802.

Next, a neighboring base station belonging mobile node registering unit 150 of other base station 140 that receives the Routing Update message obtains the global IP address of the mobile node that is reported by the Routing Update message, and sets a next hop transfer destination of the packet addressed to this global IP address to be the source base station (Node B), and sets a transfer destination IF to be the IF that receives the message, and registers these information in the Routing Table in step S804. In this step, the MAC address of the source base station is registered in the Neighbor Cache.

Figure 8B:
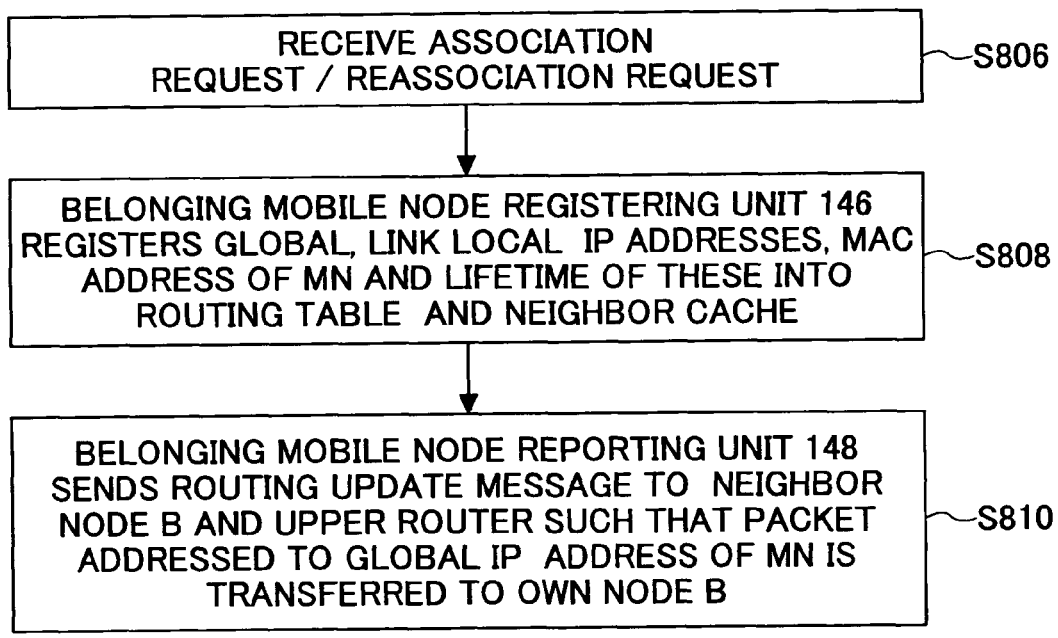
FIG. 8B is a flowchart showing the route control table generation processing in the base station of an embodiment of the present invention.

Next, mobile node registering processing in the base station 140 is described with reference to FIG. 8B.

First, the base station 140 receives the Association Request/Reassociation Request message from the mobile node 120 in step S806.

Next, the belonging mobile node registering unit 146 registers, in the Routing Table and the Neighbor Cache, global IP address (network layer address) of the mobile node 120, the link local IP address of the mobile node 120, the MAC address (data link layer address) of the mobile node 120 and the Lifetime of these addresses in step S808.

Next, the belonging mobile node reporting unit 148 sends, to at least one of neighboring base stations and the upper router, the Routing Update message indicating that the transfer destination of a packet addressed to the global IP address of the mobile node 120 is the own base station (Node B) in step S810.

Figure 8C:
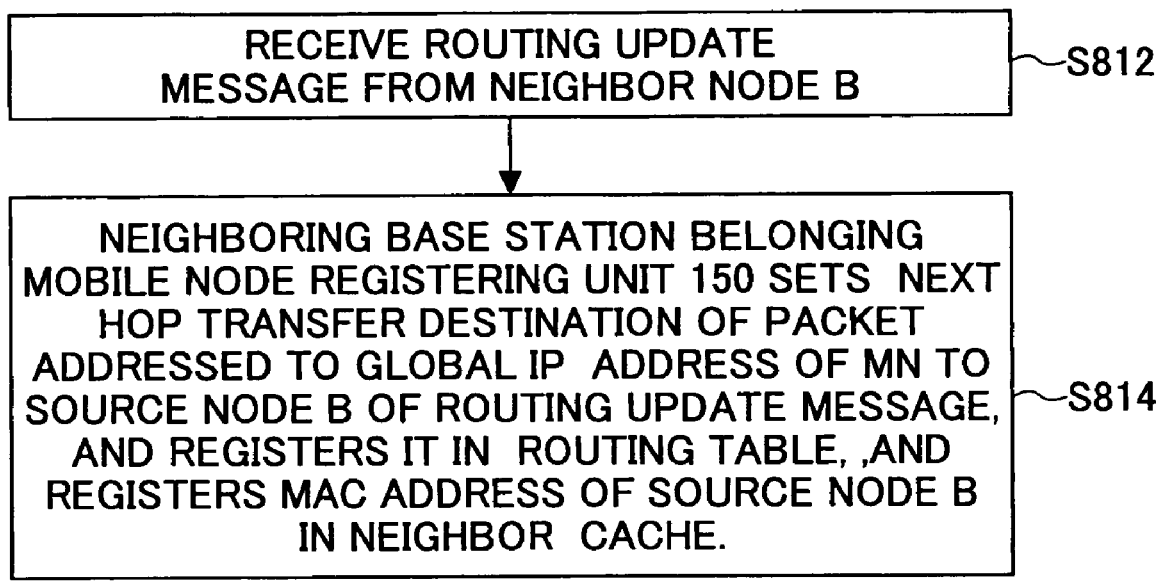
FIG. 8C is a flowchart showing the route control table generation processing in the base station of an embodiment of the present invention.

Next, operation of the base station that receives the Routing Update message from the neighboring base station is described with reference to FIG. 8C.

The base station receives the Routing Update message from the neighboring base station in step S812.

Next, the neighboring base station belonging mobile node registering unit 150 registers the source base station of the Routing Update message into the Routing Table as a transfer destination of the next hop of the packet addressed to the reported global IP address of the mobile node. In addition, the MAC address of the source base station is registered in the Neighbor Cache in step S814.

Figure 8D:
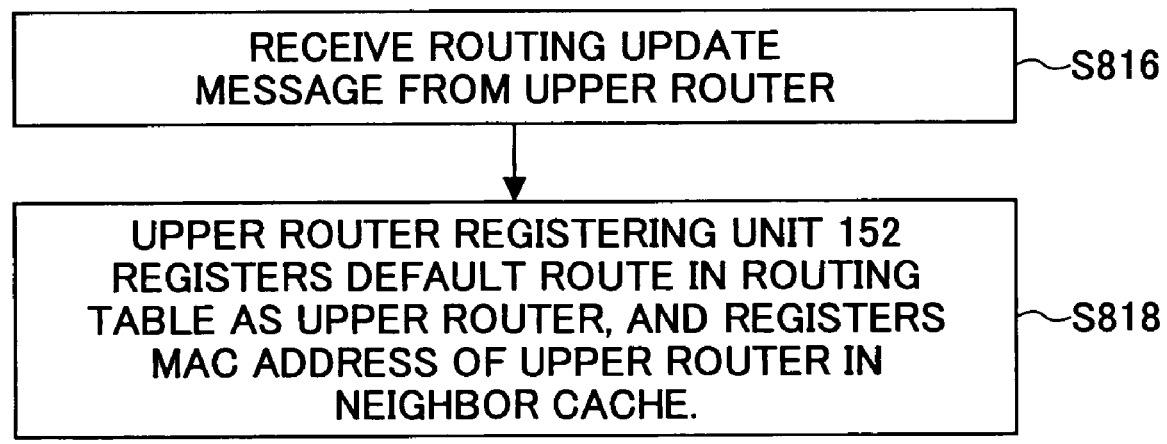
FIG. 8D is a flowchart showing the route control table generation processing in the base station of an embodiment of the present invention.

Next, operation of the base station that receives the Routing Update message from the upper router is described with reference to FIG. 8D.

The base station receives the Routing Update message from the upper router 180 in step S816.

Next, the upper router registering unit 152 registers the upper router into the Routing Table as a Default Router. In addition, the MAC address of the upper router is registered in the Neighbor Cache in step S818.

Figure 10:
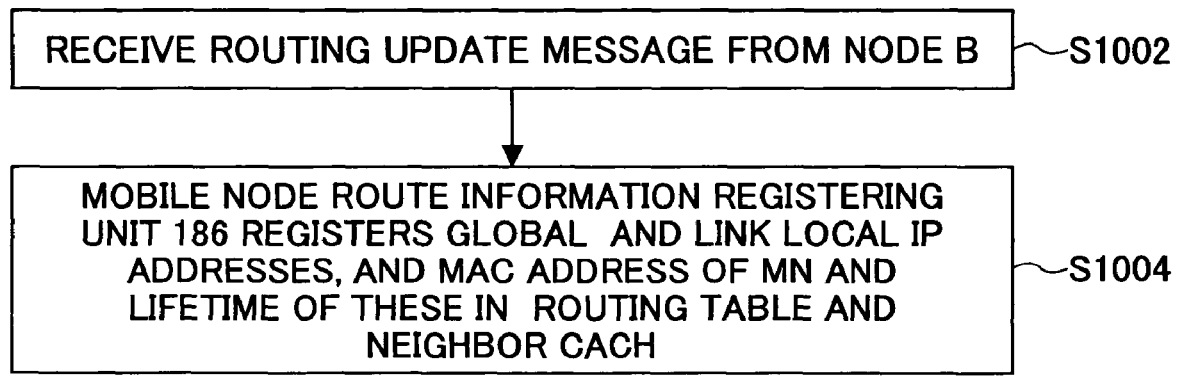
FIG. 10 is a flowchart showing the route control table generation processing in the upper router of an embodiment of the present invention.

Next, route control table generation processing in the upper router 180 is described with reference to FIGS. 9 and 10.

The upper router 180 obtains route information of the mobile node 120 from the base station 140, and reports the Default Route to base stations belonging to the own upper router using Routing Update message. That is, the upper router 180 reports information indicating that a packet addressed to a destination address that is not registered in the base station 140 should be transferred to the upper router 180. The Default Route is a route to a next hop node that is a transfer destination when a destination IP address of the packet is not registered in the Routing Table. This reporting is periodically performed by the Routing Update message.

More specifically, when the mobile node route information registering unit 186 receives the Routing Update message, the mobile node route information registering unit 186 obtains a global IP address (network layer address) of the mobile node written in the message, sets the transfer destination of a next hop of the packet addressed to this global IP address to be the source base station of the Routing Update message, and sets the transfer destination interface to be an interface that receives the Routing Update message, and registers these information in the Routing Table.

In addition, the mobile node route information registering unit 186 registers the MAC address of the base station into the Neighbor Cache as a data link layer address for transferring a packet to the IP address of the base station of the next hop.

The default route reporting unit 188 reports the Default Route to the base station 140 using the Routing Update message. The Routing Update message is periodically transmitted to the base station 140. Accordingly, route information for the Default Route can be reported. The default route reporting unit 188 sends the Routing Update message to all node multicast address, for example, to report the Routing Update message to every base station existing under the upper router 180.

When the upper router registering unit 152 of the base station 140 receives the Routing Update message from the upper router 180, the upper router registering unit 152 registers the upper router in the Routing Table as the Default Route. In addition, the upper router registering unit 152 registers the MAC address of the upper router into the Neighbor Cache as a data link layer address for transferring the packet to the IP address of the upper router. When data is already registered, the upper router registering unit 152 updates parameter such as Lifetime.

That is, when the upper router registering unit 152 of the base station 140$_1$ (Node B_1) receives the Routing Update message from the upper router 180, the upper router registering unit 152 sets IF_Y as an interface of a transfer destination of the next hop on the Default Route, and registers it. IF_Y is an IF of the base station 140$_1$ and indicates that the next hop is the upper router 180 (Router_1). In addition, the upper router registering unit 152 of the base station 140$_1$ (Node B_1) registers the MAC address (Router_1_MACaddr) of the Router_1 for the IP address (Router_1 IPaddr) of the Router_1 and sets REACHABLE in the Neighbor Cache.

When the upper router registering unit 152 of the base station 140$_2$ (Node B_2) receives the Routing Update message from the upper router 180, the upper router registering unit 152 sets IF_W as an interface of a transfer destination of the next hop on the Default Route, and registers it. IF_W is an IF of the base station 140$_2$ and indicates that the next hop is the upper router 180 (Router_1). In addition, the upper router registering unit 152 of the base station 140$_2$ (Node B_2) registers the MAC address (Router_1_MACaddr) of the Router_1 for the IP address (Router_1 IPaddr) of the Router_1 and sets REACHABLE in the Neighbor Cache.

Next, route control table generation processing in the upper router 180 is described with reference to FIG. 10.

The upper router 180 receives the Routing Update message from the base station in step S1002.

Next, the mobile node route information registering unit 186 registers the global IP address, the link local IP address, the MAC address and Lifetime of these addresses of the mobile node 120 in the Routing Table and the Neighbor Cache in step S1004.

Next, packet transmit and receive processing in the mobile node 120 and packet transferring processing in the base station 140 and the upper router 180 are described. In the following description, communication between mobile nodes (MN) 120 belonging to the same base station (Node B) 140, communication between mobile nodes (MN) belonging to different base stations 140 (Node B) under the same upper router 180, and communication between mobile nodes (MN) belonging to base stations 140 (Node B) under different upper routers 180 are described.

Figure 11:
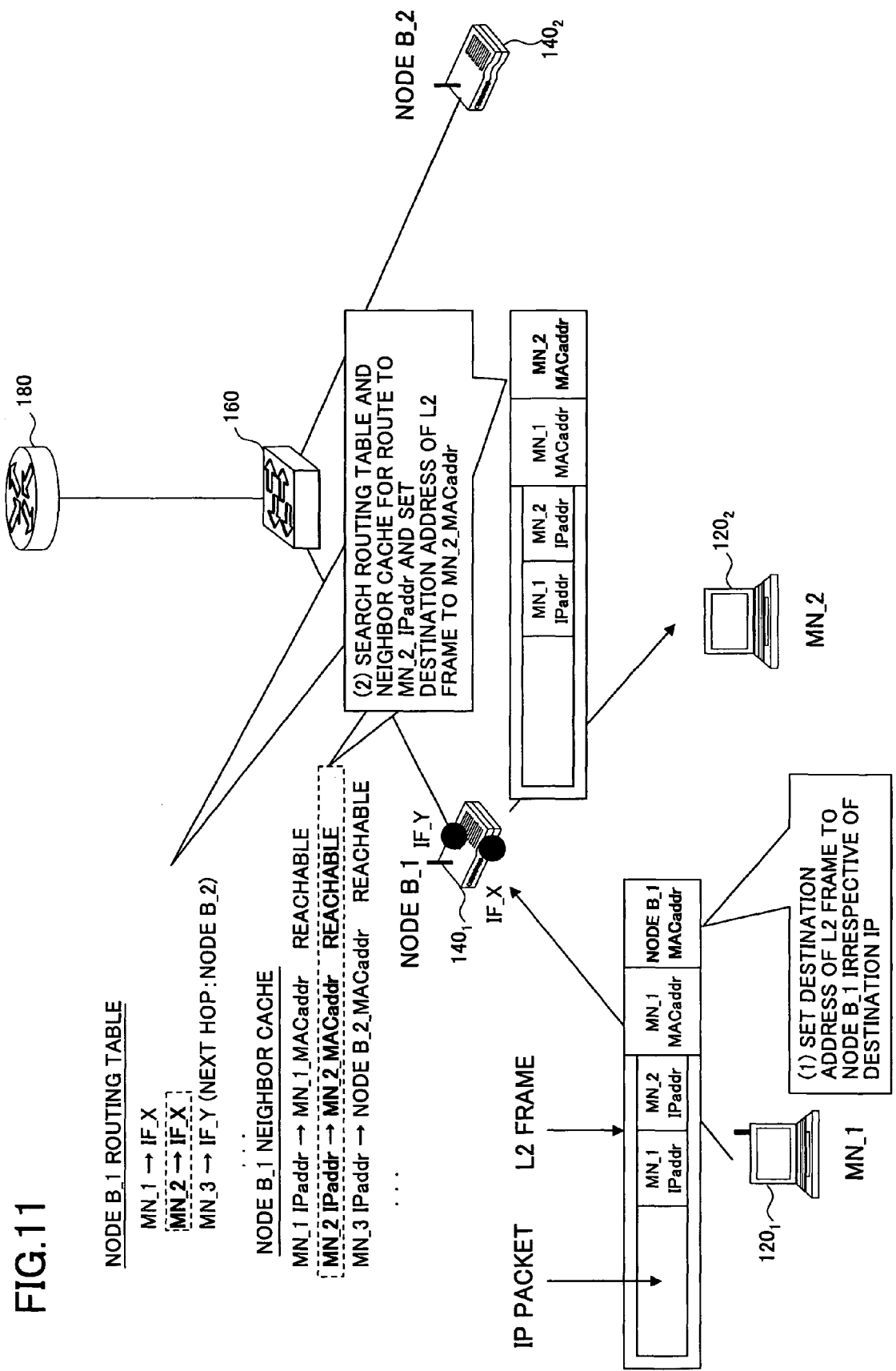
FIG. 11 is a flowchart showing communication between mobile nodes of an embodiment of the present invention.

First, the communication between mobile nodes (MN) 120 belonging to the same base station (Node B) 140 is described with reference to FIG. 11. In the following, communication between the mobile node 120$_1$ and the mobile node 120$_2$ belonging to the same base station 140$_1$ is described as an example.

The packet transmission unit 130 of the sending side mobile node 120$_1$ (MN_1) sets a destination address of a layer 2 frame (L2 frame) to be the MAC address of the base station 140$_1$ (Node B_1) to which the MN_1 belongs irrespective of the destination IP address (1). For example, the packet transmission unit 130 sets the base station 140$_1$ (Node B_1) as the destination address of the L2 frame irrespective of the destination IP address and sends the L2 frame.

The packet transferring unit 154 of the base station 140$_1$ (Node B_1) searches the Routing table and the Neighbor Cache for a route to the IP address (MN_2_IPadder) of the mobile node 120$_2$ (MN_2), and sets a destination address of the L2 frame to be the MAC address of the mobile node 120$_2$ (MN_2) and sends the L2 frame (2). As a result, the IP packet sent from the MN_1 is received by the mobile node 120$_2$ (MN_2) belonging to the same base station 140$_1$ (Node B_1).

Figure 12:
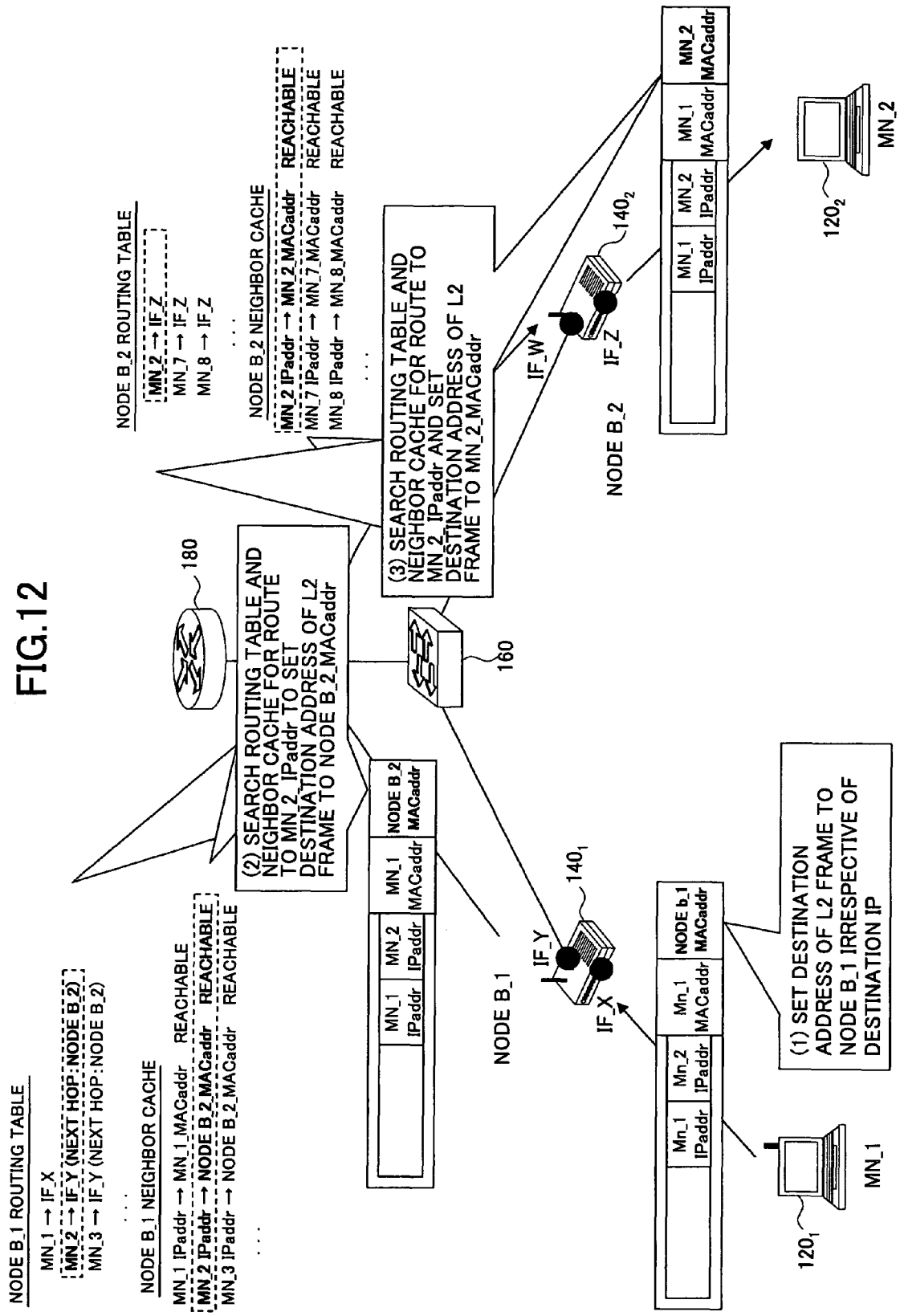
FIG. 12 is a flowchart showing communication between mobile nodes of an embodiment of the present invention.

Next, communication between mobile nodes (MN) belonging to different base stations 140 (Node B) under the same upper router 180 is described with reference to FIG. 12.

In the following, communication between the mobile node 120$_1$ and the mobile node 120$_2$ respectively belonging to the base station 140$_1$ and base station 140$_2$ under the upper router 180 is described.

The packet transmission unit 130 of the transmission side mobile node 120$_1$ (MN_1) sets a destination address of a layer 2 frame (L2 frame) to be the MAC address of the base station to which the MN_1 belongs irrespective of destination IP address (1). For example, the packet transmission unit 130 sets the destination address of the L2 frame to be the MAC address of the base station 140$_1$ (Node B_1) irrespective of the destination IP address, and sends the L2 frame.

The packet transferring unit 154 of the base station 140$_1$ (Node B_1) searches the Routing table and the Neighbor Cache for a route to the IP address (MN_2_IPadder) of the mobile node 120$_2$ (MN_2), sets the destination address of the L2 frame to be the MAC address (Node B_2_MACaddr) of the base station 140$_2$ (Node B_2) of the L2 frame, and sends the L2 frame (2). As a result, a packet transferred from the base station 140$_1$ (Node B_1) is sent to the base station 140$_2$ (Node B_2) via the layer 2 switch 160.

The packet transferring unit 154 of the base station 140$_2$ (Node B_2) searches the Routing table and the Neighbor Cache for a route to the IP address (MN_2_IPadder) of the mobile node 120$_2$ (MN_2), sets the destination address of the L2 frame to be the MAC address (MN_2_MACaddr) of the mobile node 120$_2$ (MN_2), and sends the L2 frame (3). As a result, the IP packet transmitted from the mobile node 120$_1$ (MN_1) is received by the mobile node 120$_2$ (MN_2) belonging to a different base station under the same upper router.

Next, communication between mobile nodes 120 belonging to base stations 140 (Node B) under different upper routers 180 are described with reference to FIG. 13. In this example, communication between the mobile node 120$_1$ and the mobile node 120$_7$ respectively belonging to base stations under different upper routers 180$_1$ and 180$_2$ is described.

The packet transmission unit 130 of the transmission side mobile node 120$_1$ (MN_1) sets the destination address of the layer 2 frame (L2 frame) to be the MAC address of the base station 140$_1$ to which the MN_1 belongs irrespective of destination IP address. For example, the packet transmission unit 130 sets the destination address of the L2 frame to be the MAC address of the base station 140$_1$ (Node B_1) irrespective of the destination IP address, and sends the L2 frame.

The packet transferring unit 154 of the base station 140$_1$ (Node B_1) refers to the destination IP address of the IP header of a packet, and searches the Routing Table and the Neighbor Cache for a next hop transfer destination for the destination IP address and a data link layer address of the transfer destination. When the object IP address is not registered in the Routing Table, the destination mobile node belongs to a base station under a different upper router. Therefore, the packet transferring unit 154 sends a packet to the upper router via the Default Route. For example, since the route to the IP address (MN_7_IPaddr) of the mobile node $120_7$ (MN_7) does not exist in the Routing Table and the Neighbor Cache, the packet transferring unit 154 of the base station $140_1$ (Node B_1) sets the next hop to be the Default Route, and sends the packet (2). As a result, a packet transferred from the base station $140_1$ (Node B_1) is sent to the upper router $180_1$ via the layer 2 switch 160.

Next, the upper router $180_1$ transfers the packet to the upper router $180_2$ using the Edge Mobility transfer method (3). The upper router $180_2$ transfers the packet to a base station to which the mobile node $120_7$ belongs in the above-mentioned way. The base station that receives the transferred packet transfers the packet to the mobile node $120_7$ (MN_7). As a result, the IP packet transmitted from the mobile node $120_1$ (MN_1) is received by the mobile node $120_7$ (MN_7).

Accordingly, at the time of making a belonging request to a base station to be connected to when the mobile node is launched or when hand-off is performed, the mobile node reports route information to the own mobile node to the base station. In response to that, the mobile node can obtain information necessary for transferring packet to the base station. In addition, the mobile node can send a packet by setting the transfer destination of the packet to be the base station irrespective of the destination of communication partner.

The base station registers route information of the mobile station when receiving the belonging request from the mobile node, and reports the registered route information to neighboring base stations. Accordingly, mobile stations under different base stations can communicate with each other using an optimum route.

A router existing on an upper side of the base station reports, to the upper router, information to set a transfer destination of a packet addressed to a mobile node that does not exist in the route control table. Accordingly, a packet transfer route can be established for communication between mobile nodes under different upper routers.

As mentioned above, according to this embodiment, a route control method and a packet transferring method linked with launch and hand-off of the mobile station can be realized. Accordingly, when Edge Mobility is applied as a mobility control scheme of the Core Network, packet transfer in a Radio Access Network, that is conventionally difficult, can be realized using an optimum route, and efficient route update can be performed by linking with launch or hand-off.

In addition, according to this embodiment, since the base station performs route control table generation and packet transfer of IP in host route, the route in the RAN (Radio Access Network) can be optimized without using the NDP (Neighbor Discovery Protocol). Accordingly, IP packets can be transferred using an optimum route also in the RAN of a packet communication system to which Edge Mobility is applied. In addition, by performing route update in response to launch or hand-off of the mobile node, band of communication route can be efficiently used compared with a case in which the route is periodically updated, such as a route control scheme.

The mobile node, base station, router and packet communication system of the present invention can be applied to a packet communication system conforming to Edge Mobility.

The present invention is not limited to the specifically disclosed embodiments, and variations and modifications may be made without departing from the scope of the present invention.

The present application contains subject matter related to Japanese patent application No. 2005-025309, filed in the JPO on Feb. 1, 2005, the entire contents of which are incorporated herein by reference.

What is claimed is:

1. A mobile node suitable for a packet communication system including a node, a link and a base station that complies with an Edge Mobility scheme, the mobile node belonging to the base station and comprising:
  a route information reporting unit configured to report route information including a network layer address and a data link layer address of the mobile node to the base station, wherein the route information and an interface from which a packet destined to the mobile node is output are registered in a table of the base station;
  a route information registering unit configured to obtain information including a data link layer address of the base station from the base station, and register the information in a route control table;
  a storing unit configured to store the route control table;
  a packet transmission unit configured to set a data link layer destination address of a packet addressed to another mobile node to be the data link layer address of the base station that is registered in the route control table regardless of a destination network layer address of the another mobile node, and transmit the packet; and
  a packet reception unit configured to receive a packet transmitted from a source mobile node, wherein
  when the source mobile node belongs to the base station, the packet reception unit receives the packet in which a destination address of the packet is set, by the base station, to be the data link layer address of the mobile node, and
  when the source mobile node belongs to a neighboring base station, the base station receives the packet having the data link layer address of the base station as a destination address from the neighboring base station, and the packet reception unit receives the packet in which a destination address of the packet is set, by the base station, to be the data link layer address of the mobile node.

2. The mobile node as claimed in claim 1, wherein:
  the route information reporting unit is configured to report the route information for at least one of when the mobile node is launched and when hand-off is performed; and
  the route information registering unit is configured to obtain the information for at least one of when the mobile node is launched and when hand-off is performed.

3. The mobile node as claimed in claim 1, wherein:
  the route information reporting unit is configured to report the route information using an Association Request message when the mobile node is launched; and
  the route information registering unit is configured to obtain the information from an Association Response message that is transmitted to the mobile node in response to the Association Request message.

4. The mobile node as claimed in claim 1, wherein:
  the route information reporting unit is configured to report the route information using a Reassociation Request message when the mobile node performs hand-off; and
  the route information registering unit is configured to obtain the information from a Reassociation Response message that is transmitted to the mobile node in response to the Reassociation Request message.

5. A base station that provides wireless access in a packet communication system including a node and a link that complies with an Edge Mobility scheme, and that belongs to an upper router, the base station comprising:
- a belonging mobile node registering unit configured to register a first route information of a mobile node that establishes a belonging relationship with the base station into a route control table, wherein the first route information includes a network layer address, a data link layer address of the mobile node and an interface from which a packet destined to the mobile node is output;
- a belonging mobile node reporting unit configured to report a second route information of the mobile node to at least one of a neighboring base station and the upper router, wherein the second route information indicates that a next hop for sending a packet addressed to the mobile node is the base station that reports the second route information;
- a route information registering unit configured to obtain at least one of the second route information to a mobile node belonging to the neighboring base station and a default route information to the upper router, and to register that route information into the route control table;
- a storing unit configured to store the route control table; and
- a packet transfer unit configured to transfer a packet to a destination mobile node based on the route control table, wherein the packet transfer unit obtains a data link layer address as a transfer destination of the packet from the route control table based on a destination network layer address included in the packet, sets the data link layer address into the packet as a destination data link layer address of the packet, and transfers the packet, when the destination mobile node belongs to the base station, the data link layer address set in the packet is a data link layer address of the destination mobile node, and when the destination mobile node belongs to the neighboring base station that belongs to the upper router, the data link layer address set in the packet is a data link layer address of the neighboring base station.

6. The base station as claimed in claim 5, wherein:
the belonging mobile node registering unit is configured to register the route information into the route control table when the mobile node is launched;
the belonging mobile node reporting unit is configured to report the route information to at least one of the neighboring base station and the upper router when the mobile node is launched; and
the route information registering unit is configured to obtain the second route information to the mobile node from the neighboring base station and register the obtained route information into the route control table when the mobile station under the neighboring base station is launched.

7. The base station as claimed in claim 6, wherein:
the belonging mobile node registering unit is configured to register, into the route control table, at least one of a network layer address and a data link layer address of the mobile node that are included in an Association Request message sent from the mobile node;
the belonging mobile node reporting unit is configured to report a route to a network layer address of the registered mobile node to at least one of the neighboring base station and the upper router using a Routing Update message, when the first route information of the mobile node is registered; and the route information registering unit is configured to register, into the route control table, the network layer address of the mobile node included in a Routing Update message sent from the neighboring base station.

8. The base station as claimed in claim 5, wherein:
the belonging mobile node registering unit is configured to register the first route information into the route control table when the mobile node performs hand-off;
the belonging mobile node reporting unit is configured to report the second route information to at least one of the neighboring base station and the upper router when the mobile node performs hand-off; and
the route information registering unit is configured to obtain the second route information to the mobile node from the neighboring base station and registers the route information into the route control table when the mobile node under the neighboring base station performs hand-off.

9. The base station as claimed in claim 8, wherein:
the belonging mobile node registering unit is configured to register, into the route control table, at least one of a network layer address and a data link layer address of the mobile node that are included in a Reassociation Request message transmitted from the mobile node;
the belonging mobile node reporting unit is configured to report a route of a network layer address of the registered mobile node to at least one of the neighboring base station and the upper router using a Routing Update message, when the first route information of the mobile node is registered; and
the route information registering unit is configured to register, into the route control table, a network layer address of the mobile node included in the Routing Update message transmitted from the neighboring base station.

10. A router in an upper side of plural base stations, each base station providing wireless access in a packet communication system including a node and a link complying with an Edge Mobility scheme, the router comprising:
- a mobile node route information registering unit configured to obtain route information to a mobile node from a base station and register the route information and an interface from which a packet destined to the mobile node is output into a route control table, wherein the route information indicates that a next hop for sending a packet addressed to the mobile node is the base station that reports the route information; and
- a default route reporting unit configured to report default route information to the base station that belongs to the router, wherein the default route information includes a network layer address and a data link layer address of the router, and the default route information is used by the base station to send a packet addressed to a mobile node for which there is no specific route information, wherein when the base station that belongs to the router receives a packet addressed to a destination mobile node belonging to an other base station belonging to a different router, the base station transmits the packet to the router based on the default route information, then, the router receives the packet from the base station and transmits the packet to the different router.

11. The router as claimed in claim 10, wherein:
the mobile node route information registering unit is configured to register, into the route control table, a network layer address of the mobile node included in a Routing Update message transmitted from a base station under the router; and the default route reporting unit is configured to report, to a base station under the router, a network layer address and a data link layer address of the router, using a Routing Update message, as a route to a mobile node that is not registered in the route control table held by the base station.

12. A packet communication system that conforms to an Edge Mobility scheme, comprising:
a mobile node that includes
a route information reporting unit configured to report route information including a network layer address and a data link layer address of the mobile node to a base station, wherein the route information and an interface from which a packet destined to the mobile node is output are registered in a table of the base station,
a route information registering unit configured to obtain information including a data link layer address of the base station from the base station, and register the information in a route control table,
a storing unit configured to store the route control table,
a packet transmission unit configured to set a data link layer destination address of a packet addressed to another mobile node to be the data link layer address of the base station that is registered in the route control table regardless of a destination network layer address of the mobile node, and transmit the packet, and
a packet reception unit configured to receive a packet transmitted from a source mobile node;
said base station that includes
a belonging mobile node registering unit configured to register a first route information of a mobile node that establishes a belonging relationship with the base station into a route control table, wherein the first route information includes a network layer address, a data link layer address of the mobile node and an interface from which a packet destined to the mobile node is output,
a belonging mobile node reporting unit configured to report a second route information of the mobile node to at least one of a neighboring base station and an upper router, wherein the second route information indicates that a next hop for sending a packet addressed to the mobile node is the base station that reports the second route information,
a route information registering unit configured to obtain at least one of the second route information to a mobile node belonging to the neighboring base station and a default route information to the upper router, and to register that route information into the route control table,
a storing unit configured to store the route control table, and
a packet transfer unit configured to transfer a packet based on the route control table; and a router that includes
a mobile node route information registering unit configured to obtain route information to a mobile node from a base station and register the route information and an interface from which a packet destined to the mobile node is output into a route control table, wherein the route information indicates that a next hop for sending a packet addressed to the mobile node is the base station that reports the route information, and
a default route reporting unit configured to report default route information to the base station, wherein the default route information includes a network layer address and a data link layer address of the router, and the default route information is used by the base station to send a packet addressed to a mobile node for which there is no specific route information, wherein
when the source mobile node belongs to the base station, the packet reception unit receives the packet in which a destination address of the packet is set, by the base station, to be the data link layer address of the mobile node, and
when the source mobile node belongs to a neighboring base station, the base station receives the packet having the data link layer address of the base station as a destination address from the neighboring base station, and the packet reception unit receives the packet in which a destination address of the packet is set, by the base station, to be the data link layer address of the mobile node.

13. The system according to claim 12, wherein
the packet transfer unit obtains a data link layer address as a transfer destination of the packet from the route control table based on a destination network layer address included in the packet, sets the data link layer address into the packet as a destination data link layer address of the packet, and transfers the packet,
when a destination mobile node of the packet belongs to the base station, the data link layer address set in the packet is a data link layer address of the destination mobile node, and
when the destination mobile node belongs to the neighboring base station that belongs to the upper router, the data link layer address set in the packet is a data link layer address of the neighboring base station.

14. The system according to claim 12, wherein the base station belongs to the upper router, and when the base station receives a packet addressed to a destination mobile node belonging to an other base station belonging to a different router, the base station transmits the packet to the router based on the default route information, then, the router receives the packet from the base station and transmits the packet to the different router.

* * * * *